United States Patent [19]

Jüemann et al.

[11] Patent Number: 4,917,340
[45] Date of Patent: Apr. 17, 1990

[54] RETAINING BRACKET FOR FASTENING CABLES OR GROUPS OF CABLES

[75] Inventors: Dietrich Jüemann, Lörrach; Mathias Hänsel; Wolfgang Schneider, both of Kandern, all of Fed. Rep. of Germany

[73] Assignee: A. Raymond, Lorrach, Fed. Rep. of Germany

[21] Appl. No.: 264,728

[22] Filed: Oct. 31, 1988

[30] Foreign Application Priority Data

Nov. 2, 1987 [DE] Fed. Rep. of Germany ....... 3737113

[51] Int. Cl.⁴ ............................................... F16L 3/08
[52] U.S. Cl. ..................................... 248/74.2; 24/543; 24/555
[58] Field of Search ....................... 248/74.2, 74.3, 73; 24/543, 487, 555, 559

[56] References Cited

U.S. PATENT DOCUMENTS

| | | | |
|---|---|---|---|
| 3,980,263 | 9/1976 | Okuda | 248/74.3 X |
| 4,023,758 | 5/1977 | Yuda | 248/74.3 X |
| 4,195,807 | 4/1980 | Llauge | 248/74.2 |
| 4,470,179 | 9/1984 | Gollin et al. | 248/74.2 X |
| 4,614,321 | 9/1986 | Andre | 24/555 X |
| 4,762,296 | 8/1988 | Kraus et al. | 248/74.2 |
| 4,840,334 | 6/1989 | Kikuchi | 248/74.2 X |
| 4,840,345 | 6/1989 | Neil et al. | 24/487 X |

FOREIGN PATENT DOCUMENTS 3403330 9/1984 Fed. Rep. of Germany .
2134586 3/1987 United Kingdom .

*Primary Examiner*—David M. Purol
*Attorney, Agent, or Firm*—Finnegan, Henderson, Farabow, Garrett & Dunner

[57] ABSTRACT

A retaining bracket for cables having a U-shaped retention space and a pair of cover arms that spring open upon insertion of a cable into the bracket and snap back into a locked position to hold the cables in place.

3 Claims, 1 Drawing Sheet

RETAINING BRACKET FOR FASTENING CABLES OR GROUPS OF CABLES

BACKGROUND OF THE INVENTION

This invention relates to a retaining bracket of hard, flexible plastic material for fastening or holding elongated components with different diameters, such as cables or groups of cables, onto carrier plates. Such retaining brackets typically have a base plate provided with a fastening element for securing it to the carrier plate and side walls that rise from the edges of the base plate and surround a U-shaped retention space for the cables. On the free ends of the walls are integrally formed arms which cover the area of the opening and have cooperating locking edges on their outer ends. After the arms have been snapped into place, these locking edges are held together under tension to retain the cables in the bracket. An example of such a bracket is shown in West German Application No. 34 03 330.

In a prior art bracket of this kind, there are two resilient band-shaped covers, one of which protrudes from the upper edge of a wall substantially parallel to the base plate, while the other cover is connected to the opposite side wall by means of a thin, flexible section and stands up perpendicularly, so that the cables can be inserted into the retention space through the free opening. After insertion of the cables, the cover that stands up perpendicularly is swung downwards. At the same time, the elastic side wall is bent outwards until the locking edge moves past the locking edge on the other cover and can be engaged therewith after which the side wall springs back.

One disadvantage of this cable holder is that in order to close it and to open it again, special manipulation and skill are required to bring the gripping projections or locking edges together and to release them if additional cables are to be inserted later on.

Therefore, an object of the present invention is to provide a retaining bracket of the above-mentioned type where the cables can be quickly and simply pushed into the retention space either initially or later on with only a few hand motions on the locking parts and where the cables, once they have been pushed in, are securely held in place.

SUMMARY OF THE INVENTION

To accomplish this, a retaining bracket of elastic plastic material is provided for holding elongated components of different diameters to a carrier plate comprising a base plate having means for fastening the bracket to a carrier plate, a pair of integral side walls that extend upwardly from the edges of the base plate to form a U-shaped retention space having an upwardly directed opening for insertion of the components, cover arms integrally connected to the upper free ends of side walls that cover the opening and cooperating locking edges on the free ends of the cover arms that engage with each other under tension to lock the cover arms in place, a first cover arm being relatively rigid and extending obliquely downward into the retention space from the upper end of one side wall and the other cover arm being relatively flexible and extending across the opening from the upper end of the other side wall and partially overlapping the upper side of the first cover arm, whereby upon insertion of a component the flexible arm deflects downwardly beyond the locking edge of the first cover arm until it is free to snap back and engage its locking edge with the locking edge on the first cover arm.

BRIEF DESCRIPTION OF THE DRAWINGS

The drawings show one embodiment of the invention, which will be explained in more detail below. In the drawings:

FIG. 2 shows the retaining bracket mounted on a carrier plate before a cable is pushed in;

FIG. 3 shows the retaining bracket while the cable is being pushed in;

FIG. 4 shows the retaining bracket in snapped-in condition after the cable has been pushed in.

DETAILED DESCRIPTION OF THE INVENTION

Figure 1:
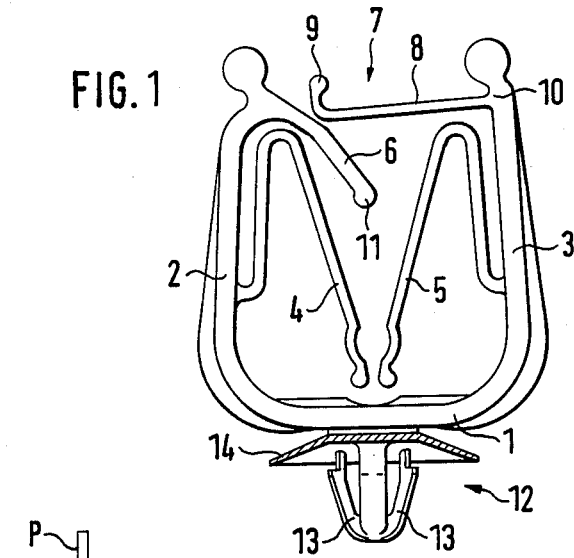
FIG. 1 is a side view of the retaining bracket of the invention.

The retaining bracket shown in the drawings is made of a hard, flexible elastic material and is essentially made up of a base plate 1 and side walls 2 and 3 integrally connected thereto in a U-shaped fashion. The walls have spring arms 4 and 5 that project into the interior of the U that can be expanded elastically, the spring arms being elastically adaptable to the diameter of the cables or groups of cables inserted into the bracket to center them in the bracket. For this purpose, the spring arms 4 and 5 are joined in the lower half of the retention space to the side walls 2 and 3 and initially rise tightly along the side walls to a level a short distance below the cover arms 6 and 8 described hereinafter, from which they extend down obliquely to the middle until they reach a position just above the base plate 1.

At the free end of the left side wall 2 there is integrally formed, with a relatively rigid cross section, a cover arm 6 which is directed obliquely downward toward the interior space and which covers approximately half of the opening 7 between the two side walls 2 and 3. Cover arm 6 has a locking edge 11 at its lower end. At the free end of the right side wall 3 there is also integrally formed, at 10, another cover arm 8, which, however, is made more flexible than cover arm 6 and which lies across the opening 7 and partially overlaps cover arm 6. Cover arm 7 has at its free end an angled locking edge 9, which, after cover arm 8 has been pushed in, holds back against the edge 11 of cover arm 6 under tension, making it impossible for any unintentional release of an inserted cable 17. The locking edges 9, 11 could take a variety of shapes but as shown comprise thickened portions on the free ends of the cover arms forming cooperating locking hooks that engage with each other as the flexible arm 8 springs back into place underneath rigid arm 6.

To fasten the retaining bracket to a carrier plate 15, the base plate 1 is provided with a fastening means 12. In the present embodiment this means comprises a supporting shield 14 and two spring legs 13 which can be pressed together and anchored in a hole 16 in a carrier plate 15 in a known manner. It will be understood that instead of the fastening means shown, other known anchoring means can be employed, such as expansion rivets, and screwed or bolted joints.

Figure 2:
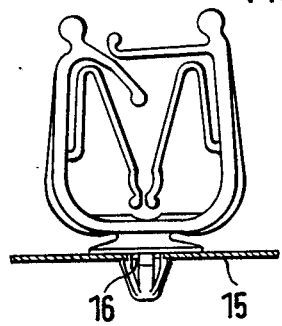
Figure 3:
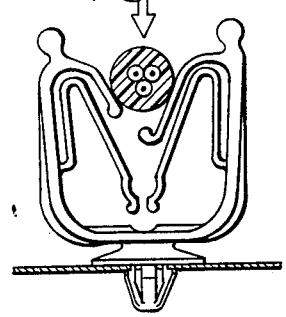
Figure 4:
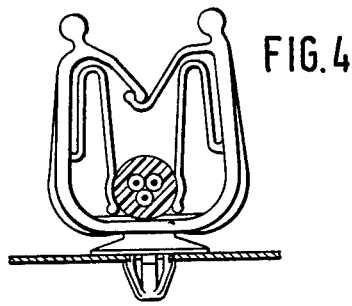

FIGS. 2–4 show the sequence of operations for securing a cable 17 with a relatively thin cross section in the bracket of the invention. In FIG. 2, the cable 17 is situated above the cover arm 8 and is pushed downwards in the direction of the arrow "P". In the process, the cover arm 8 deflects elastically downwards and sideways, thereby acting as a lead-in as shown in FIG. 3. At the same time, locking edge 9, which initially rests on the top of cover arm 6 slides downwards over it, forces the side walls 2 and 3 outwards, as also shown in FIG. 3. As soon as the cable 17 passes the lowest point between the locking edge 11 and the locking edge 9, the side walls 2 and 3 spring back to their initial position, while the cover arm 8 simultaneously moves rapidly upwards, so that its locking edge 9 engages underneath the locking edge 11 of cover arm 6. As a result, the opening 7 is securely closed, so that the cable cannot be released.

Figure 5:
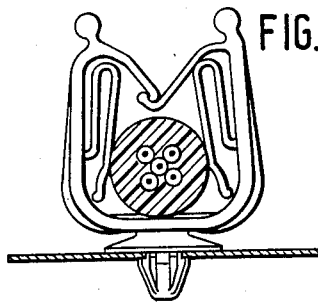
FIG. 5 shows the same retaining bracket being used with a thicker cable.

FIG. 5 shows the same retaining bracket used with a cable of thicker diameter than cable 17.

As a result of the novel construction and arrangement of the covers, the following advantages are obtained:

Upon insertion of a cable, the cover arm lying across the opening is bent downwards to permit the cable to be inserted into the bracket and then it automatically springs back to the closed position as soon as the cable has passed between the two cover arms and reached the retention space. The closure is absolutely secure, since the locking edges, by virtue of the restoring force of the plastic material, will necessarily remain engaged and the cover arm pointing obliquely into the retention space will resist any tensile force that may be acting on the cable to remove it. Moreover, additional cables can be inserted at a later stage, provided there still is room in the retention space, quite easily because, when the flexible cover arm is again pushed inwards it will immediately open to let the cable pass and will again snap back into place under the spring action of the arm.

What is claimed is:

1. A retaining bracket of elastic plastic material for holding elongated components of different diameters to a carrier plate comprising a base plate including first and second opposite edges and having means for fastening the bracket to a carrier plate, a first integral side wall that extends upwardly from said first edge of said base plate and terminating in a first free end, a second integral side wall that extends upwardly from said second edge of said base plate and terminating in a second free end, said first and second integral side walls forming a U-shaped retention space having an upwardly directed opening for insertion of said components, a first cover arm being integrally connected to said first free end of said first side wall and further including a first cooperating locking edge on a free end thereof, a second cover arm being integrally connected to said second free end of said second side wall and further including a second cooperating locking edge on a free end thereof, said first cover arm being relatively rigid and extending obliquely downward into the retention space from said first free end of said first side wall, said first cover arm covers approximately one-half of said opening, said second cover arm being relatively flexible and extending across the opening from said second free end of said second side wall and partially overlapping an upper side thereof of said first cover arm, whereby, upon insertion of said components said second cover arm deflects downwardly beyond said first cooperating locking edge of said first cover arm thereby permitting said components to enter the retention space and allowing said second cover arm to snap back and engage its said second cooperating locking edge with said first cooperating locking edge of said first cover arm thus securing said components therein.

2. The retaining bracket of claim 1, wherein said first and second cooperating locking edges comprise thickened portions forming cooperating locking hooks.

3. The retaining bracket of claim 1, including a pair of elastic spring arms adaptable to the size of the component that extend into the retention space from said first and second side walls of the bracket to center the component within the bracket.

* * * * *

UNITED STATES PATENT AND TRADEMARK OFFICE
CERTIFICATE OF CORRECTION

PATENT NO. : 4,917,340

DATED : April 17, 1990

INVENTOR(S) : Dietrich Junemann et al.

It is certified that error appears in the above-identified patent and that said Letters Patent is hereby corrected as shown below:

Title Page, Inventors:, "Juemann" should be --Junemann.

Signed and Sealed this

Sixteenth Day of July, 1991

Attest:

HARRY F. MANBECK, JR.

*Attesting Officer*     *Commissioner of Patents and Trademarks*